United States Patent
Finn

(10) Patent No.: US 10,015,699 B2
(45) Date of Patent: Jul. 3, 2018

(54) METHODS AND DEVICES FOR POLICING TRAFFIC FLOWS IN A NETWORK

(71) Applicant: Cisco Technology, Inc., San Jose, CA (US)

(72) Inventor: Norman Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 117 days.

(21) Appl. No.: 15/082,044

(22) Filed: Mar. 28, 2016

(65) Prior Publication Data
US 2017/0280357 A1    Sep. 28, 2017

(51) Int. Cl.
| | |
|---|---|
| H04L 12/875 | (2013.01) |
| H04W 28/14 | (2009.01) |
| H04L 12/861 | (2013.01) |
| H04L 12/813 | (2013.01) |
| H04W 56/00 | (2009.01) |
| H04L 12/26 | (2006.01) |

(52) U.S. Cl.
CPC ............ *H04W 28/14* (2013.01); *H04L 47/20* (2013.01); *H04L 49/9005* (2013.01); *H04W 56/001* (2013.01)

(58) Field of Classification Search
CPC ......... H04L 45/04; H04L 45/48; H04L 47/10; H04L 45/60; H04L 45/16
USPC ................................ 370/503, 350, 400, 412
See application file for complete search history.

(56) References Cited

U.S. PATENT DOCUMENTS

| | | | | |
|---|---|---|---|---|
| 6,834,053 B1 * | 12/2004 | Stacey | ................ | H04L 12/5601 370/395.4 |
| 6,977,930 B1 * | 12/2005 | Epps | ....................... | H04L 47/10 370/392 |
| 8,411,694 B1 * | 4/2013 | Orr | ..................... | H04L 47/2458 370/230 |
| 9,077,619 B2 * | 7/2015 | Edsall | ..................... | H04L 43/08 |
| 9,667,561 B2 * | 5/2017 | Yu | ........................... | H04L 47/56 |

(Continued)

OTHER PUBLICATIONS

Teener, Michael Johas, "Peristaltic Shaper: updates, multiple speeds," IEEE 802.1 Time-Sensitive Networking TG (2014), available at http://wwwieee802.org/1/files/public/docs2014/new-tsn-mjt-peristaltic-shaper-0114.pdf (last accessed Mar. 17, 2016).

(Continued)

*Primary Examiner* — Charles C Jiang
*Assistant Examiner* — Will Lin
(74) *Attorney, Agent, or Firm* — Meunier Carlin & Curfman LLC

(57) ABSTRACT

Devices and methods for policing traffic flows in a network are described herein. For example, a network device can include a processing unit and a memory operably coupled to the processing unit. The network device can be configured to provide an input port and an output port, the input and output ports being configured to process a traffic flow received at the network device. The network device can also be configured to queue the traffic flow using a plurality of buffers associated with the output port, cyclically direct the traffic flow from the input port to each of the plurality of buffers according to a queuing schedule, and enforce a policer policy synchronized to the queuing schedule. The policer policy can ensure that the traffic flow does not exceed a predetermined bandwidth.

14 Claims, 5 Drawing Sheets

(56) References Cited

U.S. PATENT DOCUMENTS

| | | | | |
|---|---|---|---|---|
| 2005/0105532 A1* | 5/2005 | Yun | ............... | H04L 47/10 |
| | | | | 370/395.21 |
| 2006/0133406 A1* | 6/2006 | Homer | ............... | H04J 3/08 |
| | | | | 370/442 |
| 2009/0296670 A1* | 12/2009 | Luo | ............... | H04L 47/10 |
| | | | | 370/338 |
| 2012/0275301 A1* | 11/2012 | Xiong | ............... | H04L 49/357 |
| | | | | 370/230 |
| 2014/0321476 A1* | 10/2014 | Yu | ............... | H04L 47/6235 |
| | | | | 370/418 |
| 2015/0103836 A1* | 4/2015 | Chandhoke | ............... | H04L 12/4666 |
| | | | | 370/401 |
| 2016/0127267 A1* | 5/2016 | Kumar | ............... | H04L 49/252 |
| | | | | 370/400 |
| 2017/0005951 A1* | 1/2017 | Labonte | ............... | H04L 49/3045 |
| 2017/0187641 A1* | 6/2017 | Lundqvist | ............... | H04L 47/621 |

OTHER PUBLICATIONS

Metro Ethernet Forum (MEF) Technical Specification 103 (MEF 10.3) (2013), available at https://www.mef.net/Assets/Technical_Specifications/PDF/MEF_10.3.pdf (last accessed Mar. 17, 2016).

Finn, N., "Scheduled queues, UBS, CQF, and Input Gates," IEEE 802.2 interim, Atlanta (Jan. 2015), available at http://www.ieee802.org/1/files/public/docs2015/new-nfinn-input-gates-0115-v03.pdf.

\* cited by examiner

METHODS AND DEVICES FOR POLICING TRAFFIC FLOWS IN A NETWORK

BACKGROUND

Cyclic Queuing and Forwarding ("CQF") is a technique employed by network devices in a network to achieve zero congestion loss and deterministic latency. According to CQF, network devices cyclically queue data to, and drain data from, a plurality of buffers. For example, a queuing schedule is implemented on each network port of a network device. The plurality of buffers receive data in according with time schedules (e.g., time clocks) having an equal period but offset in phase to align with a transmitter's (e.g., another network device) cyclic buffer swapping. The queuing schedule ensures that data is cyclically directed to the buffers such that data is always stored to an idle buffer (i.e., a buffer that is not draining).

In a network implementing CQF, every flow must be limited by a maximum allocated bandwidth (e.g., a bit-time-on-the-wire per cycle). This guarantees that the network will not drop data due to network congestion. In the event a transmitter exceeds its maximum allocated bandwidth, queues will overflow and data will be lost. Thus, policing is desirable to prevent misbehaving flows. However, conventional credit-based policing is not accurate on a short-enough timescale to prevent data loss. For example, conventional credit-based policers analyze average throughput. Due to the jitter in the transmissions of any given flow, conventional credit-based policing cannot prevent a few extra packets from being directed to the buffers. In worst case scenarios, multiple input ports can each place a few extra packets into an output buffer, and as a result, the network device is unable to transmit the extra packets in one cycle.

BRIEF DESCRIPTION OF THE DRAWINGS

The components in the drawings are not necessarily to scale relative to each other. Like reference numerals designate corresponding parts throughout the several views.

DESCRIPTION OF EXAMPLE EMBODIMENTS

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for providing policing in a network implementing CQF, it will become evident to those skilled in the art that the implementations are not limited thereto.

Overview

Described herein are methods and devices for policing traffic flows in a network. As described herein, the network can optionally be a time-sensitive network such as a network implementing CQF, for example. An example method can include receiving a traffic flow on an input port of a network device, and queuing the traffic flow using a plurality of buffers associated with an output port of the network device. The method can also include cyclically directing the traffic flow from the input port to each of the plurality of buffers according to a queuing schedule. Further, the method can include enforcing a policer policy synchronized with the queuing schedule. The policer policy ensures that the traffic flow does not exceed a predetermined bandwidth.

Example Embodiments

Figure 1:
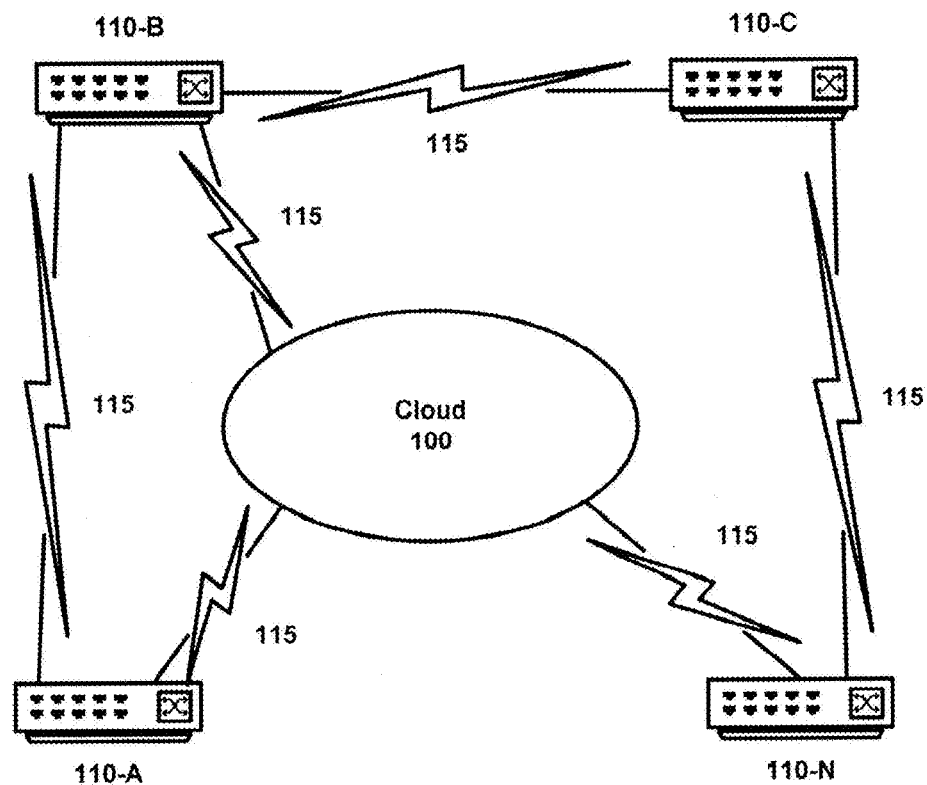
FIG. 1 is a block diagram of an example network environment.

Referring now to FIG. 1, an example network environment is shown. A plurality of network devices 110-A, 110-B, 110C, and 110-N (collectively referred to herein as "network devices 110") are communicatively connected. The network devices 110 can be communicatively connected using point-to-point connections as shown in FIG. 1 or using multipoint connections. In some implementations, the network devices 110 are communicatively connected without network relay devices between the network devices 110, e.g., using a communication link 115 as shown in FIG. 1. In some implementations, the network devices 110 are communicatively connected through network relay devices. As shown in FIG. 1, the network devices 110 can be connected to a cloud 100. The cloud 100 can include a local area network (LAN), a wireless local area network (WLAN), a wide area network (WAN), a metropolitan area network (MAN), a virtual private network (VPN), etc., including portions or combinations of any of the above networks. In some implementations, the cloud 100 can optionally be a time-sensitive network such as a network implementing CQF. For example, respective queuing schedules for all of the network devices 110 can be synchronized. Accordingly, at each of the network devices 110, data can be stored to an idle buffer(s) but never to a buffer being drained. The latency at each of the network devices 110 (e.g., each network hop) can be determined by the number of output cycles during which the data is stored in a buffer before being transmitted to the next network hop. In other implementations, one or more of the network devices 110 can be configured to implement a queuing schedule. In this implementation, at least some of the network devices in the network are not configured to implement a queuing schedules and/or the queuing schedules of the network devices are not synchronized.

Additionally, the network devices 110 can be devices configured to switch or forward packets through the cloud 100. For example, the network devices 110 can be switches, routers, bridges, and/or gateways. Optionally, the cloud 100 can include other types of computing devices including, but not limited to, client computers and/or server computers (not shown). The network devices 110 can be coupled to each other and/or to the cloud 100 through one or more communication links 115. This disclosure contemplates the communication links can be any suitable communication link.

For example, a communication link can be implemented by any medium that facilitates data exchange between the network elements including, but not limited to, wired, wireless and optical links. Example communication links include, but are not limited to, a LAN, a WAN, a MAN, Ethernet, the Internet, or any other wired or wireless link such as WiFi, WiMax, 3G or 4G. It should be understood that the network environment shown in FIG. 1 is provided only as an example. This disclosure contemplates that the systems and methods for policing described herein can be implemented in a network environment different than the one described with regard to FIG. 1, e.g., a network environment including different numbers and/or types of network devices, computing devices, networks, and/or communication links.

Figure 2:
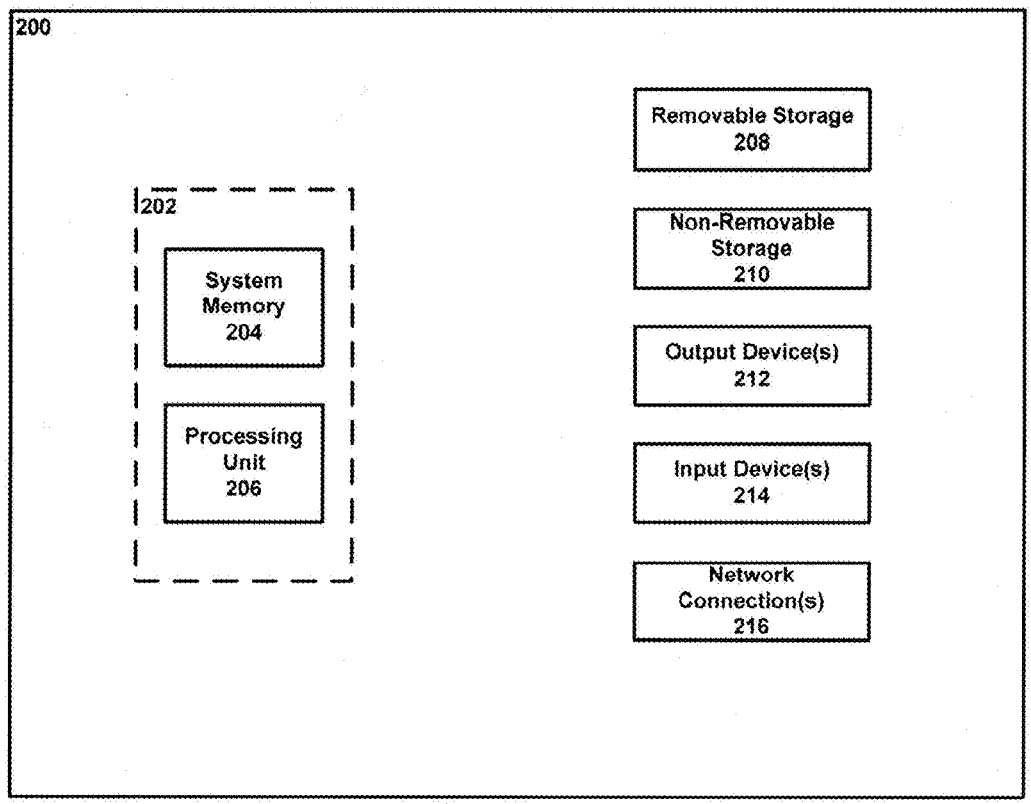
FIG. 2 is a block diagram of an example computing device.

Referring now to FIG. 2, an example computing device 200 upon which embodiments of the invention may be implemented is illustrated. This disclosure contemplates that the network devices 110 of FIG. 1 can include a computing device such as computing device 200 of FIG. 2. It should be understood that the example computing device 200 is only one example of a suitable computing environment upon which embodiments of the invention may be implemented. Optionally, the computing device 200 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 200 typically includes at least one processing unit 206 and system memory 204. Depending on the exact configuration and type of computing device, system memory 204 may be volatile (such as random access memory (RAM)), non-volatile (such as read-only memory (ROM), flash memory, etc.), or some combination of the two. This most basic configuration is illustrated in FIG. 2 by dashed line 202. The processing unit 206 may be a standard programmable processor that performs arithmetic and logic operations necessary for operation of the computing device 200. The computing device 200 may also include a bus or other communication mechanism for communicating information among various components of the computing device 200.

Computing device 200 may have additional features/functionality. For example, computing device 200 may include additional storage such as removable storage 208 and non-removable storage 210 including, but not limited to, magnetic or optical disks or tapes. Computing device 200 may also contain network connection(s) 216 that allow the device to communicate with other devices. Computing device 200 may also have input device(s) 214 such as a keyboard, mouse, touch screen, etc. Output device(s) 212 such as a display, speakers, printer, etc. may also be included. The additional devices may be connected to the bus in order to facilitate communication of data among the components of the computing device 200. All these devices are well known in the art and need not be discussed at length here.

The processing unit 206 may be configured to execute program code encoded in tangible, computer-readable media. Tangible, computer-readable media refers to any media that is capable of providing data that causes the computing device 200 (i.e., a machine) to operate in a particular fashion. Various computer-readable media may be utilized to provide instructions to the processing unit 206 for execution. Example tangible, computer-readable media may include, but is not limited to, volatile media, non-volatile media, removable media and non-removable media implemented in any method or technology for storage of information such as computer readable instructions, data structures, program modules or other data. System memory 204, removable storage 208, and non-removable storage 210 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 206 may execute program code stored in the system memory 204. For example, the bus may carry data to the system memory 204, from which the processing unit 206 receives and executes instructions. The data received by the system memory 204 may optionally be stored on the removable storage 208 or the non-removable storage 210 before or after execution by the processing unit 206.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Figure 3:
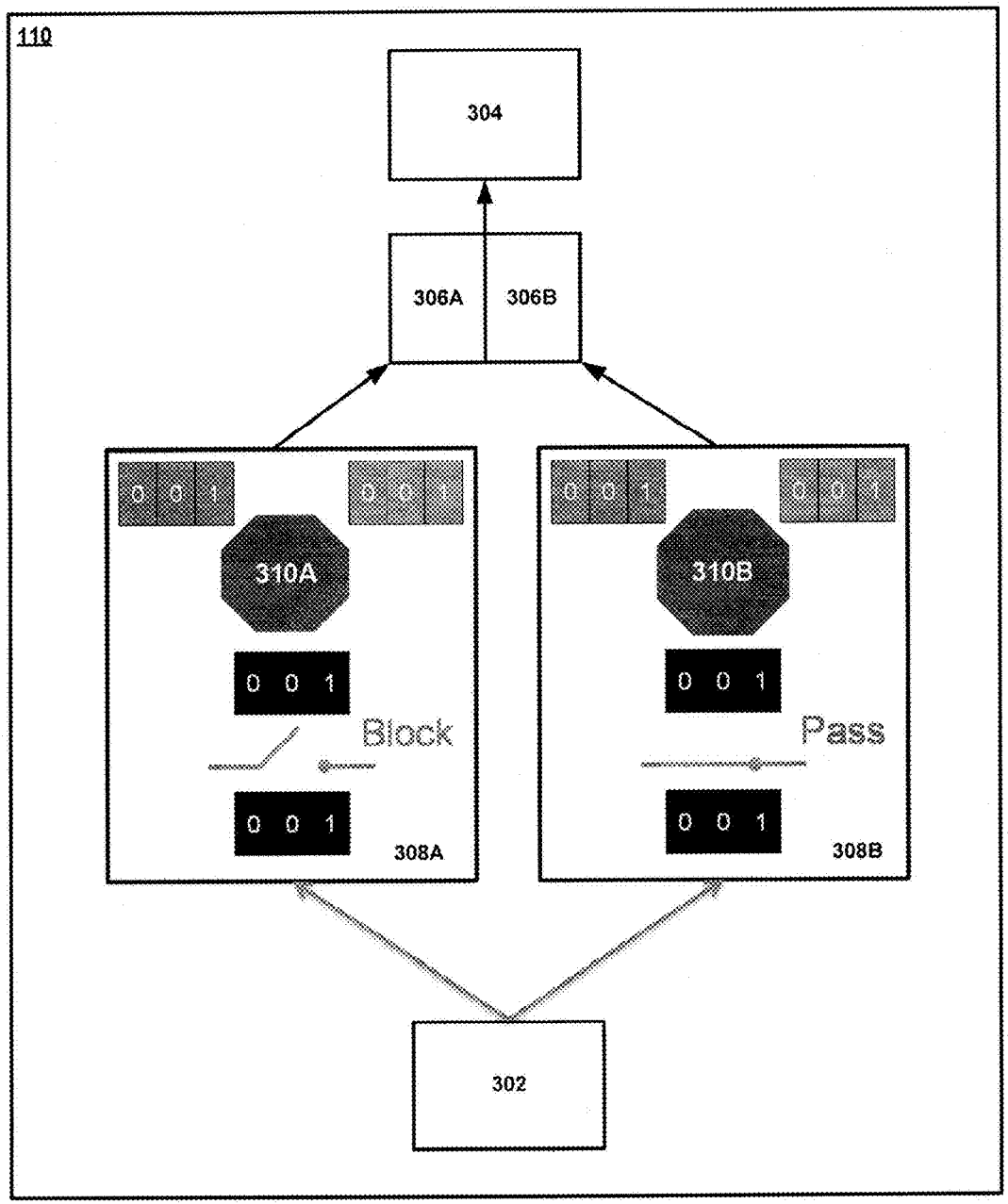
FIG. 3 is a block diagram of an example network device.

Referring now to FIG. 3, a block diagram of an example network device 110 is described. The network device 110 can include a processing unit and a memory operably coupled to the processing unit. For example, the network device 110 can optionally include the computing device 200 of FIG. 2. The network device 110 can be configured to provide an input port 302 and an output port 304, which are configured to process a traffic flow received at the network device 110. The input port 302 and the output port 304 can be virtual constructs that serve as communication endpoints in the network device 110. Ports can be identified by port number (e.g., a 16-bit number). Ports are well known in the art and are not described in further detail herein. Although one input port and one output port are shown in FIG. 3, it should be understood that the network device 110 can provide one or more input and/or output ports. Optionally, the input port 302 and the output port 304 can be configured to process a unique traffic flow. It should be understood that a traffic flow is a sequence of packets flowing through a network. Each of the packets can include a payload (e.g., data) and a header. The header can include one or more fields including, but not limited to, a source address, a destination address, a source port, a destination port, virtual local area network ("VLAN") tags, EtherType, protocol, etc. The traffic flow can be uniquely identified using information contained in the headers of the packets. For example, packets sharing the same unique combination information in one or more fields of their respective headers can be considered a unique traffic flow.

The network device 110 can include a plurality of buffers 306A, 306B (collectively referred to herein as "buffers 306") associated with the output port 304. The buffers 306 can be memory for queuing (e.g., temporarily storing) one or more packets of the traffic flow before transmission by the network device 110 (e.g., transmission to the next hop in the network). Optionally, as shown in FIG. 3, the network device 110 can include two buffers 306 associated with the output port 304. Alternatively, in some implementations, the network device 110 can include three buffers 306 associated with the output port 304. It should be understood that the network device 110 can optionally include more than three buffers 306 associated with the output port 304. Alternatively or additionally, when a plurality of output ports are provided in the network device 110, a plurality of buffers can be associated with each of the output ports (e.g., 2 or 3 buffers per output port).

Figure 4A:
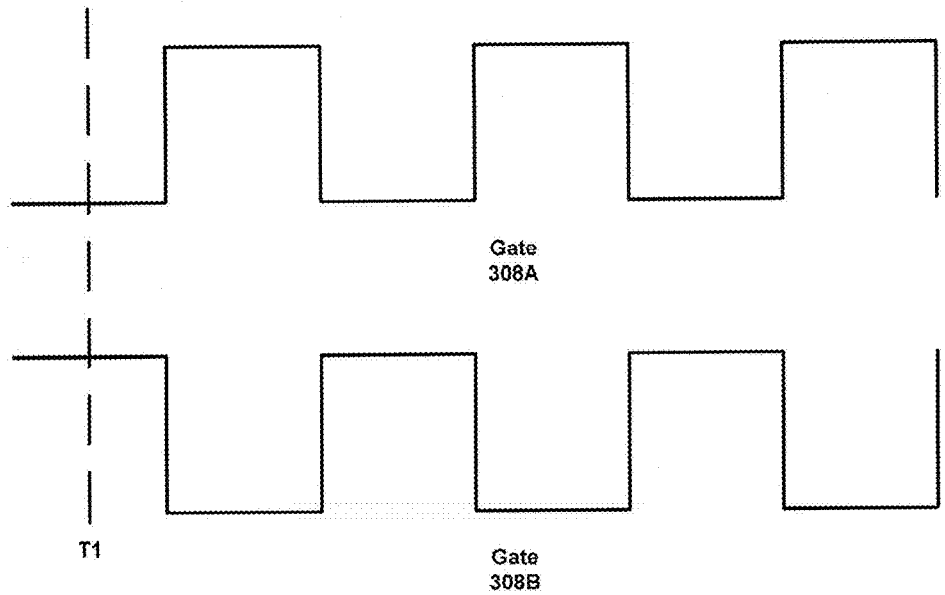
FIG. 4A is a diagram of respective time clocks for the gates of the example network device of FIG. 3.

The network device 110 can also include a plurality of gates 308A, 308B (collectively referred to herein as "gates 308"). Optionally, in some implementations, the gates 308 can be implemented on the input-port-side of the input-to-output transfer across the network device 110. Alternatively, in some implementations, the gates 308 can be implemented on the output-port-side of the input-to-output transfer across the network device 110. The gates 308 can be configured to store the traffic flow in the plurality of buffers 306 according to a queuing schedule. For example, the gates 308 can be configured to cyclically direct the traffic flow from the input port 302 to each of the buffers 306 according to a time clock. During an active portion of a time clock (e.g., ON), the gates 308 can be configured to pass the traffic flow to respective buffers 306. While during an inactive portion of a time clock (e.g., OFF), the gates 308 can be configured to block the traffic flow to respective buffers 306. Optionally, the respective time clocks for each of the gates 308 can be synchronized. For example, the respective time clocks for each of the gates 308 can optionally have the same period but be offset in phase. For example, the respective time clocks for each of the gates 308 can be offset in phase such that the respective time clock for only one of the gates 308 is active (e.g., ON) at any given time. This is shown in FIGS. 3 and 4A, where the gate 308A is open (i.e., blocking the traffic flow) and the gate 308B is closed (i.e., passing the traffic flow) at time "T1." FIG. 4A illustrates the respective time clocks for the gates 308A and 308B, which are synchronized with the same period but offset in phase. The gates 308A and 308B are therefore configured to alternately direct the traffic flow to the buffers 306A and 306B. Accordingly, a single one of the buffers 306 (e.g., buffer 306B in FIG. 3) is receiving the traffic flow at time "T1." Although two gates 308 and respective time clocks are shown in FIGS. 3 and 4A as an example, it should be understood that a network device having more than two gates can be provided.

Figure 4B:
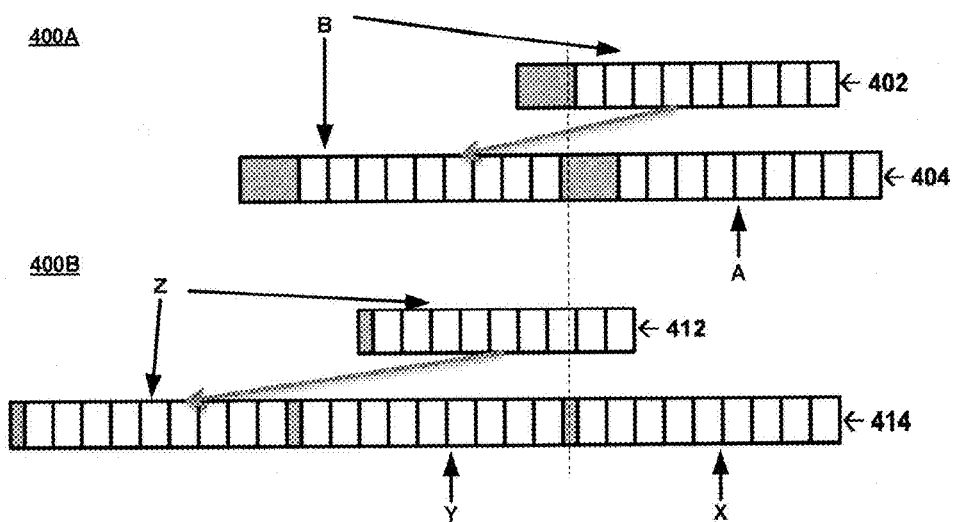
FIG. 4B is a diagram illustrating the use of the buffers in an example network device.

As described above, the gates 308 are used to cyclically direct the traffic flow to each of the plurality of buffers 306 according to the queuing schedule. The plurality of buffers 306 can also be drained according to the queuing schedule. In a network implementing CQF, all incoming frames (e.g., frames received by a network device) on one cycle are output (e.g., transmitted by the network device) on a subsequent cycle. Referring now to FIG. 4B, a diagram illustrating the use of the buffers in a network device is described. The shaded portions of FIG. 4B represent dead-time pads. It should be understood that the length of each cycle includes dead-time to accommodate data transmitted near the end of a cycle to arrive at the next network hop. An implementation with two buffers per network port is shown by 400A. A two-buffer implementation may be used when wire length and network device transmission times are negligible as compared to the length of a cycle. In this implementation, data is alternately directed to each of the buffers. While data received from a transmitter is stored in one buffer, data is draining to the next network hop from another buffer. For example, during a first cycle, frame(s) "B" of input stream 402 received at the network device is transferred to a buffer. Additionally, during the first cycle, the network device transmits frame(s) "A" of the output stream 404, which was previously stored in another buffer. Frame(s) "B" is then transmitted by the network device during a second cycle. An implementation with three buffers per network port is shown by 400B. A three-buffer implementation may be used when wire length and/or network device transmission times are not negligible as compared to the length of a cycle. In this implementation, data is cyclically directed to each of the buffers. While data received from a transmitter is stored in one buffer, another buffer is holding data, and data is draining to the next network hop from yet another. For example, during a first cycle, frame(s) "Z" of input stream 412 received at the network device is transferred to a buffer. During the first cycle, the network device transmits frame(s) "X" of the output stream 414, which was previously stored in another buffer. Then, during a second cycle, the network device transmits frame(s) "Y" of the output stream 414, which was previously stored in yet another buffer. Subsequently, frame(s) "Z" is then transmitted by the network device during a third cycle. In either case, the latency is known since data is held at each network hop (e.g., at each network device) for a fixed period of time.

Referring again to FIG. 3, the network device 110 can be configured to enforce a policer policy that is synchronized to the queuing schedule. For example, as shown in FIG. 3, each of the gates 308 can include a policer 310A, 310B (collectively referred to herein as "policer 310"). A policer is also sometimes referred to as a metering function. Policers are known in the art. For example, Metro Ethernet Forum (MEF) Technical Specification 10.3 (MEF 10.3) includes a description of policing or metering function. Each policer 310 can be configured to enforce the policer policy. The policer policy ensures that the traffic flow does not exceed a predetermined bandwidth. As described above, the gates 308 can be controlled by a time clock. For example, the respective time clocks controlling each of the gates 308 can have an equal period but be offset in phase. In some implementations, each of the policers 310 can be configured to compute a number of bits during each cycle of the time clock (e.g., the active portion of a period of the time clock controlling the gate). This is referred to herein as bit-times-on-the-wire per cycle. For example, the policer can compute (e.g., from the length of the packet, type and/or number of transformation to be performed, etc.) for each packet presented during the cycle of the time clock how many bit-times-on-the-wire the packet will consume. If the traffic flow exceeds an allocated number of bit-times-on-the-wire per cycle (e.g., the predetermined bandwidth), the policers 310 can be configured to drop one or more packets. Alternatively or additionally, if the traffic flow exceeds an allocated number of bit-times-on-the-wire per cycle (e.g., the predetermined bandwidth), the policers 310 can be configured to provide an alarm. It should be understood that the alarm can be an audio, visual, and/or tactile alarm (e.g., using the output device(s) 212 of the computing device 200 of FIG. 2). This disclosure contemplates that the allocated number of bit-times-on-the-wire per cycle can have any user-defined value. For example, the allocated number of bit-times-on-the-wire per cycle can be determined by agreement(s) between a transmitter and service provider (e.g., contracted bandwidth). By computing bit-times-on-the-wire per cycle (e.g., synchronized with the queuing schedule), each of the policers 310 can prevent excess data (even a single bit) from being passed to the buffers 306. It is therefore possible to ensure that the network will not drop even a single packet of non-offending traffic flows due to network congestion. In other words, by enforcing the policer policy on the offending traffic flow, the network can guarantee contracted bandwidth to the non-offending traffic flows.

Alternatively or additionally, in some implementations, each of the policers 310 can be configured to implement a credit-based counter. The policers 310 can be configured to increment or decrement the credit-based counter during each cycle of the time clock (e.g., the active portion of a period of the time clock controlling the gate). In these implementations, the policers 310 can increment or decrement the credit-based counter for each bit presented during the cycle of the time clock. For incrementing counters, the policers 310 can be configured to reset the credit-based counter to zero at the end of each cycle of the time clock. Similar as described above, if the credit-based counter exceeds an allocated number of bits during the cycle (e.g., the predetermined bandwidth), the policers 310 can be configured to drop one or more packets and/or provide an alarm. For decrementing counters, the policers 310 can be configured to reset the credit-based counter to the allocated number of bits at the end of each cycle of the time clock. Similar as described above, if the credit-based counter reaches zero during the cycle (e.g., the predetermined bandwidth), the policers 310 can be configured to drop one or more packets and/or provide an alarm. Using credit-based counters synchronized with the queuing schedule, each of the policers 310 can prevent excess data (even a single bit) from being passed to the buffers 306. It is therefore possible to ensure that the network will not drop even a single packet of non-offending traffic flows due to network congestion. In other words, by enforcing the policer policy on the offending traffic flow, the network can guarantee contracted bandwidth to the non-offending traffic flows.

It should be appreciated that the logical operations described herein with respect to the various figures may be implemented (1) as a sequence of computer implemented acts or program modules (i.e., software) running on a computing device (e.g., the computing device 200 of FIG. 2), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 5:
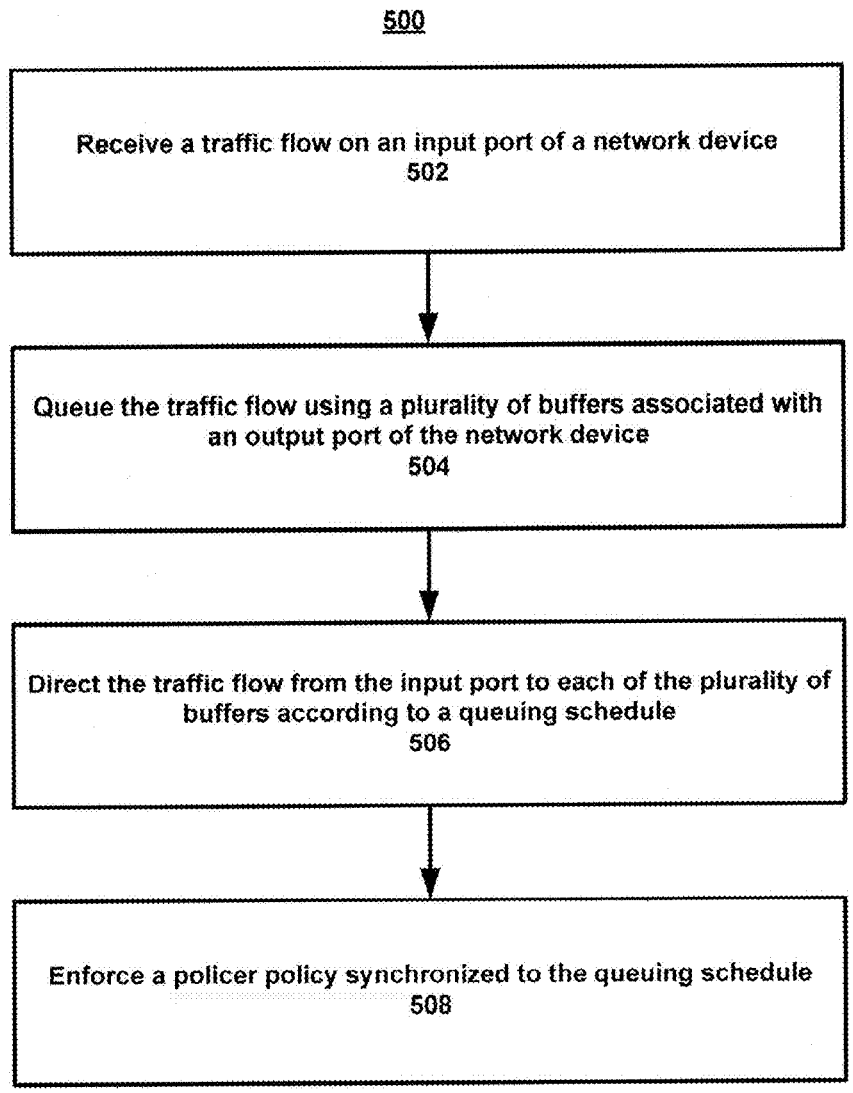
FIG. 5 is a flow diagram illustrating example operations for policing traffic flows in a network.

Referring now to FIG. 5, a flow diagram illustrating example operations 500 for policing traffic flows in a network are described. Optionally, the example operations 500 can be implemented using the network device 110 of FIG. 3, for example. At 502, a traffic flow can be received on an input port (e.g., input port 302 of FIG. 3) of a network device. At 504, the traffic flow can be queued (e.g., temporarily stored) using a plurality of buffers (e.g., buffers 306 of FIG. 3) associated with an output port (e.g., output port 304 of FIG. 3) at the network device. At 506, the traffic flow can be directed from the input port to each of the plurality of buffers according to a queuing schedule. At 508, a policer policy synchronized to the queuing schedule can be enforced. As described herein, the policer policy ensures that the traffic flow does not exceed a predetermined bandwidth. The queuing schedule can be controlled using a time clock, as described above. In addition, enforcing a policer policy can involve computing bit-times-on-the-wire per cycle of the time clock and/or using a credit-based counter per cycle of the time clock.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A network device, comprising:
   a processing unit; and
   a memory operably coupled to the processing unit, the memory having computer-executable instructions stored thereon that, when executed by the processing unit, cause the processing unit to:
     provide an input port and an output port, the input and output ports being configured to process a traffic flow received at the network device;
     queue the traffic flow using a plurality of buffers associated with the output port;
     cyclically direct the traffic flow from the input port to each of the plurality of buffers according to a queuing schedule, wherein the queuing schedule is controlled by a time clock; and
     enforce a policer policy synchronized with the queuing schedule by computing a number of bit-times-on-the-wire consumed by each packet in the traffic flow presented during a cycle of the time clock, wherein the policer policy ensures that the traffic flow does not exceed an allocated number of bit-times-on-the-wire per cycle.

2. The network device of claim 1, wherein the memory has further computer-executable instructions stored thereon that, when executed by the processing unit, cause the processing unit to drop one or more packets of the traffic flow when the traffic flow exceeds the allocated number of bit-times-on-the-wire per cycle.

3. The network device of claim 1, wherein the memory has further computer-executable instructions stored thereon that, when executed by the processing unit, cause the processing unit to provide an alarm when the traffic flow exceeds the allocated number of bit-times-on-the-wire per cycle.

4. The network device of claim 1, wherein queuing the traffic flow using a plurality of buffers associated with the output port further comprises queuing the traffic flow using two buffers associated with the output port.

5. The network device of claim 1, wherein queuing the traffic flow using a plurality of buffers associated with the output port further comprises queuing the traffic flow using three buffers associated with the output port.

6. The network device of claim 1, wherein the memory has further computer-executable instructions stored thereon that, when executed by the processing unit, cause the processing unit to cyclically drain one of the plurality of buffers according to the queuing schedule.

7. The network device of claim 1, wherein the queuing schedule of the network device is synchronized with other network devices in a time-sensitive network.

8. A method for policing traffic flows in a network, comprising:
   receiving a traffic flow on an input port of a network device;
   queuing the traffic flow using a plurality of buffers associated with an output port of the network device;
   cyclically directing the traffic flow from the input port to each of the plurality of buffers according to a queuing schedule, wherein the queuing schedule is controlled by a time clock; and
   enforcing a policer policy synchronized with the queuing schedule by computing a number of bit-times-on-the-wire consumed by each packet in the traffic flow presented during a cycle of the time clock, wherein the policer policy ensures that the traffic flow does not exceed an allocated number of bit-times-on-the-wire per cycle.

9. The method of claim 8, further comprising dropping one or more packets of the traffic flow when the traffic flow exceeds the allocated number of bit-times-on-the-wire per cycle.

10. The method of claim 8, further comprising providing an alarm when the traffic flow exceeds the allocated number of bit-times-on-the-wire per cycle.

11. The method of claim 8, wherein queuing the traffic flow using a plurality of buffers associated with the output port of the network device further comprises queuing the traffic flow using two buffers associated with the output port.

12. The method of claim 8, wherein queuing the traffic flow using a plurality of buffers associated with the output port of the network device further comprises queuing the traffic flow using three buffers associated with the output port.

13. The method of claim 8, further comprising cyclically draining one of the plurality of buffers according to the queuing schedule.

14. The method of claim 8, wherein the queuing schedule of the network device is synchronized with other network devices in a time-sensitive network.

* * * * *